Figure 1:
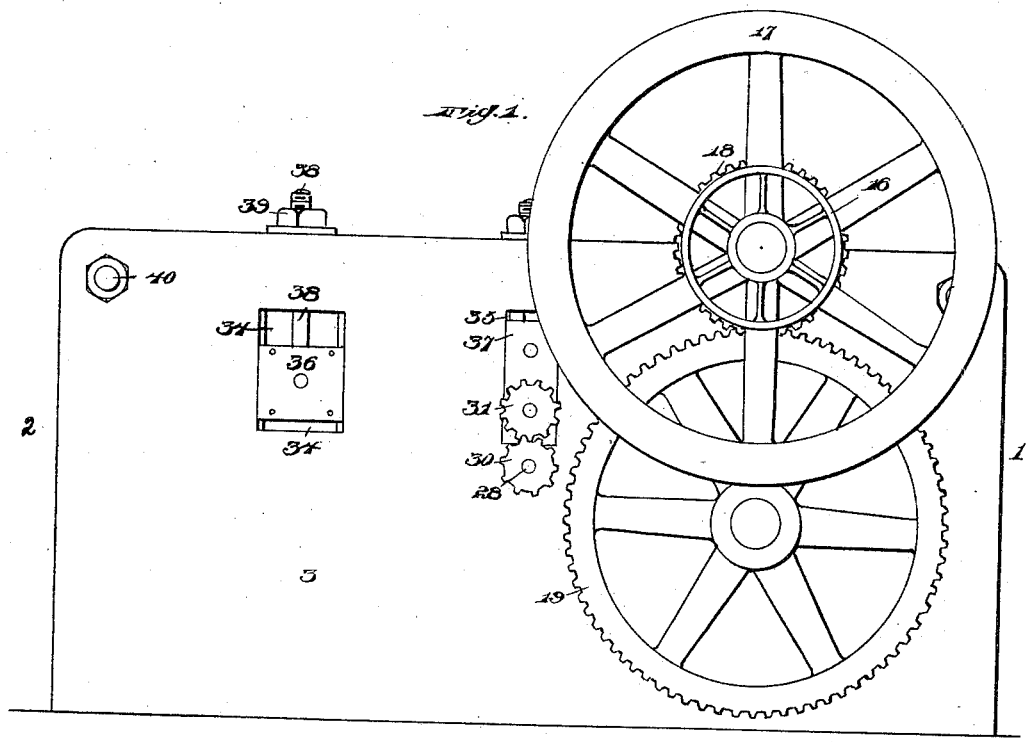

No. 684,621. Patented Oct. 15, 1901.
G. & G. E. STEIN.
MACHINE FOR OPENING LAMINATED PACKS.
(Application filed June 14, 1901.)

(No Model.) 4 Sheets—Sheet 1.

Witnesses:
J. P. Appleman
J. Wm. Harris

Inventors
G. Stein
G. E. Stein
By H. E. Dunlap
Atty.

THE NORRIS PETERS CO., PHOTO-LITHO., WASHINGTON, D. C.

No. 684,621. Patented Oct. 15, 1901.
G. & G. E. STEIN.
MACHINE FOR OPENING LAMINATED PACKS.
(Application filed June 14, 1901.)
(No Model.) 4 Sheets—Sheet 2.
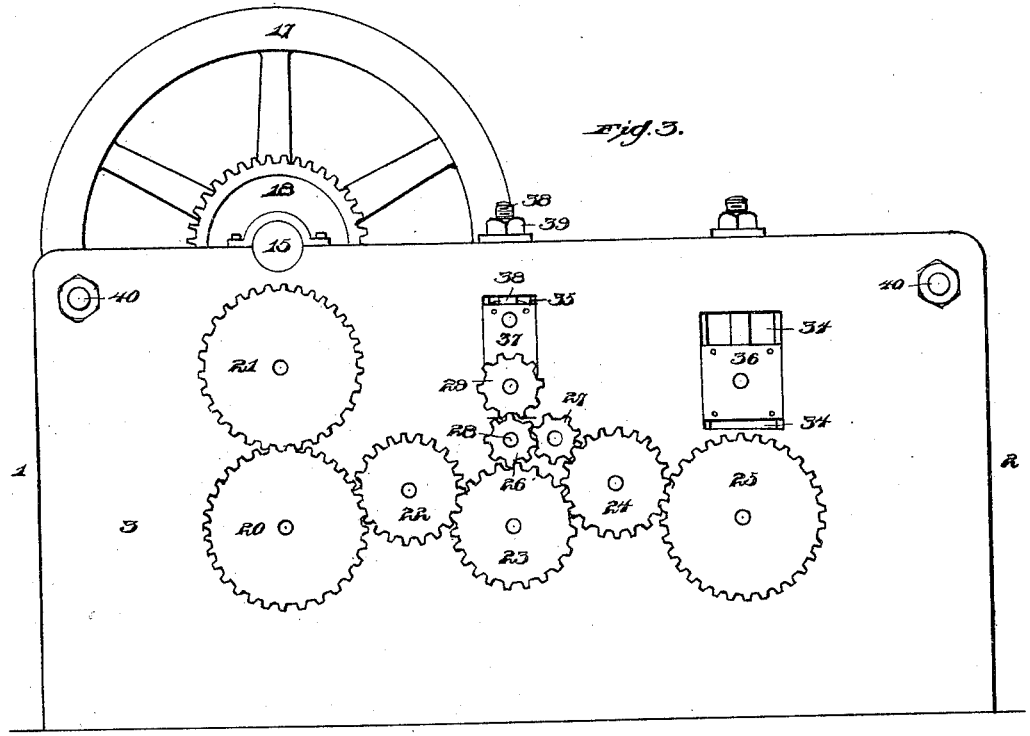
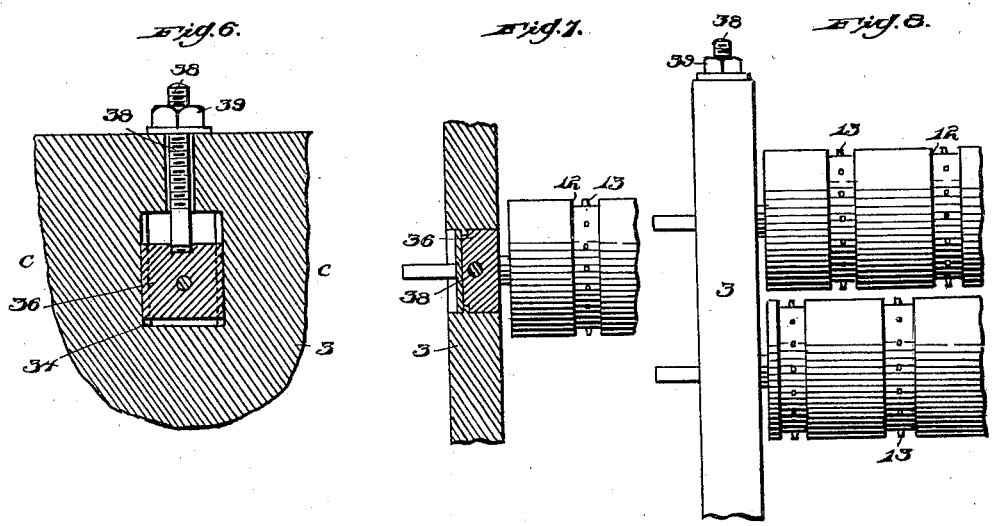
Witnesses: Inventors
G. Stein
G. E. Stein
By H. E. Dunlap
Atty.

No. 684,621. Patented Oct. 15, 1901.
G. & G. E. STEIN.
MACHINE FOR OPENING LAMINATED PACKS.
(Application filed June 14, 1901.)
(No Model.) 4 Sheets—Sheet 3.
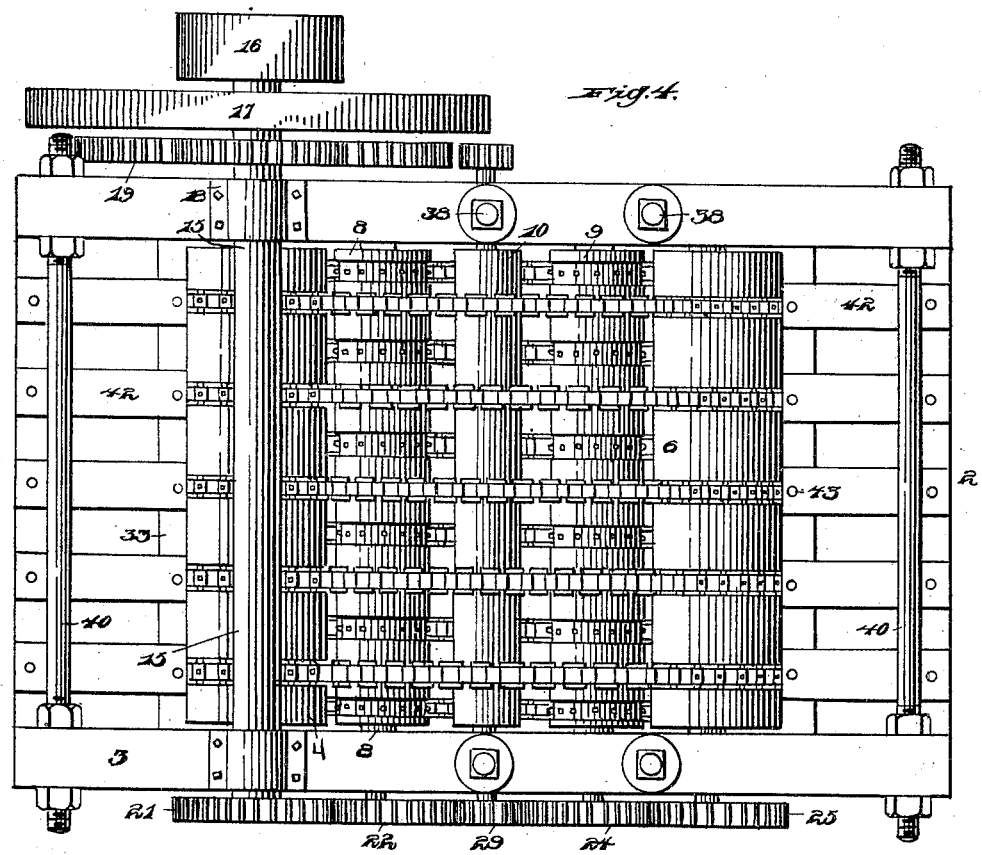
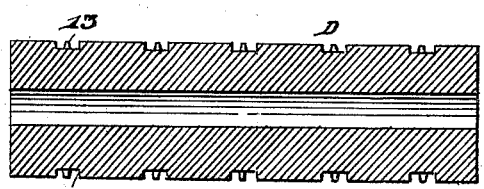
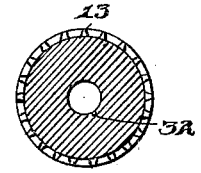
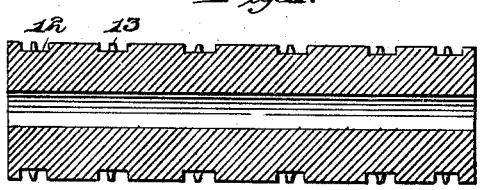
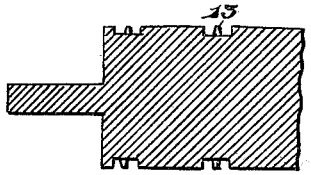
Witnesses: Inventors
G. Stein
G. E. Stein
By
H. E. Dunlap
Atty.
THE NORRIS PETERS CO., PHOTO-LITHO., WASHINGTON, D. C.

No. 684,621. Patented Oct. 15, 1901.
G. & G. E. STEIN.
MACHINE FOR OPENING LAMINATED PACKS.
(Application filed June 14, 1901.)
(No Model.) 4 Sheets—Sheet 4.
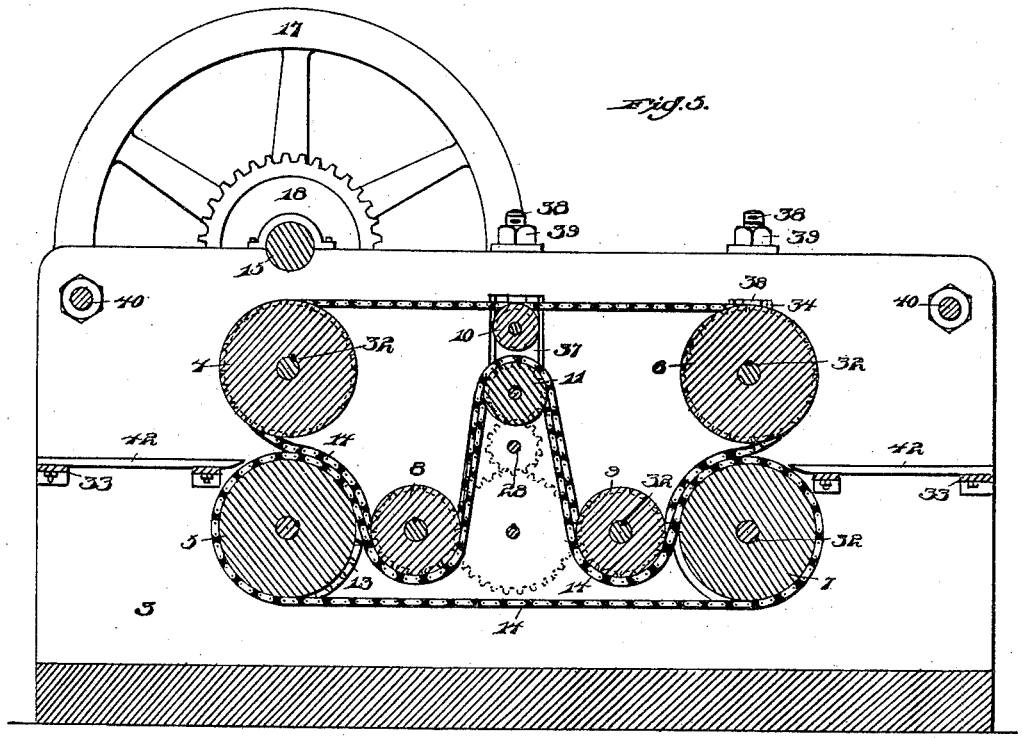
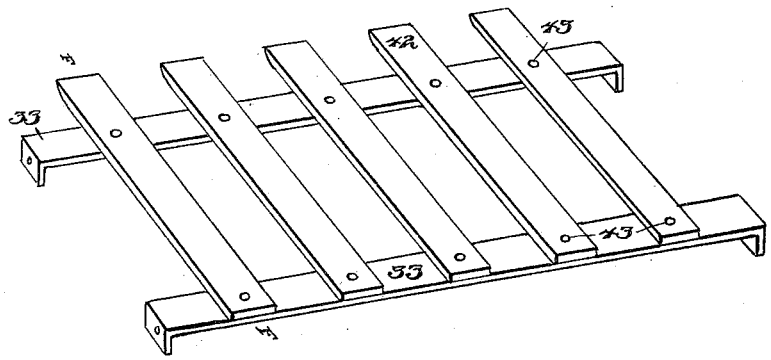

UNITED STATES PATENT OFFICE.

GEORGE STEIN AND GEORGE EDWARD STEIN, OF WHEELING, WEST VIRGINIA, ASSIGNORS OF ONE-FOURTH TO WILLIAM SCHAFER, OF SAME PLACE.

MACHINE FOR OPENING LAMINATED PACKS.

SPECIFICATION forming part of Letters Patent No. 684,621, dated October 15, 1901.

Application filed June 14, 1901. Serial No. 64,607. (No model.)

*To all whom it may concern:*

Be it known that we, GEORGE STEIN and GEORGE EDWARD STEIN, citizens of the United States of America, and residents of Wheeling, county of Ohio, and State of West Virginia, have invented certain new and useful Improvements in Machines for Opening Laminated Packs, of which the following is a specification.

Our invention relates to improvements in machines for opening or separating metal plates or sheets which have together been rolled and pressed into a compact block or pack; and it consists in the particular construction, arrangement, and combination of parts, which will hereinafter be fully described and pointed out.

The object of our invention is to provide a simple, effective, and comparatively inexpensive machine for opening blocks or packs of metal commonly termed "laminated packs." Said laminated packs consist of several sheets or thicknesses of metal which have passed from the rolls in the rolling process and have become adherent in the pack from continued pressure.

The method formerly employed to separate the sheets of a pack of tin or other metal was to open the same by hand, the sheets being split or torn apart by muscular force. Now the chief object of our invention is to provide a simple and durable machine for effecting this separation which will dispense with the necessity of separating said sheets by hand and will reduce the cost to the minimum and make it possible to do mechanically and in a greatly reduced amount of time what is now accomplished slowly and at a considerable cost. To this end we arrange two series of rolls, one series above the other, the rolls in each series being connected with each other by endless chains, and the rolls in the two series so situated that the chains connecting the upper series will flush on the under side with the upper side of the chains connecting the lower series of rolls, the two sets of chains thus forming a carrier in which a block or pack of metal, as hereinbefore described, may be carried through the machine. The rolls are placed in such a position with relation to each other that a winding or crooked course is traversed by said chains, and a pack of metal carried by said chains will be bent back and forth in its passage through the machine to such an extent that the sheets thereof will be loosened and may be readily separated without effort.

Figure 2:
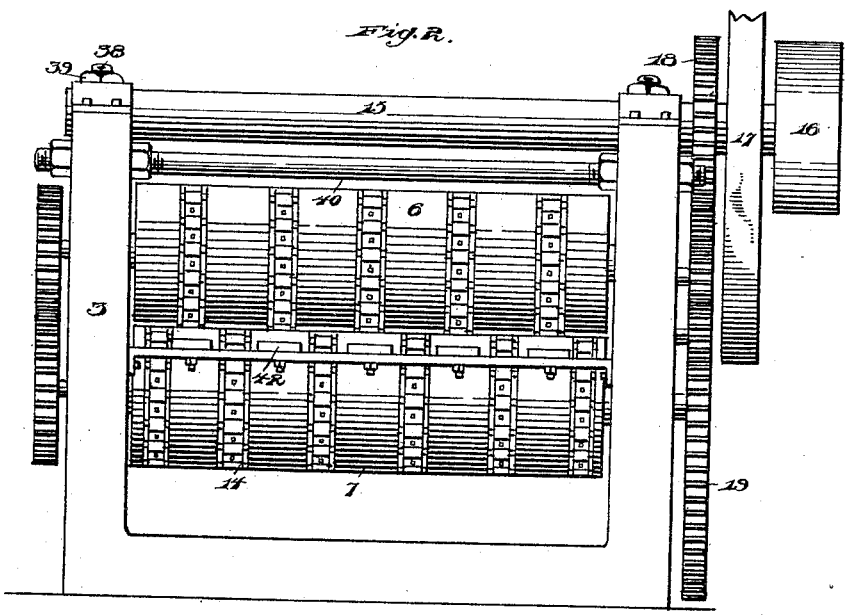

Referring to the accompanying drawings, Figure 1 represents a side elevation showing one side of our invention. Fig. 2 is a back elevation of the same. Fig. 3 is a side elevation showing the other side of the machine. Fig. 4 is a top plan view. Fig. 5 is a transverse sectional view of our invention on the line A A, Fig. 4. Fig. 6 is a vertical section of a portion of one of the housings, showing the journal-box and means employed for raising or lowering the rolls. Fig. 7 is a horizontal section on the line C C, Fig. 6. Fig. 8 is a sectional view showing the central upper rolls, all other rolls being removed. Fig. 9 is a horizontal sectional view of an upper roll, the shaft being removed. Fig. 10 is a central vertical section of a roll adapted to be secured on a keyed shaft, taken on the line D D, Fig. 9. Fig. 11 is a horizontal sectional view of a lower roll, the shaft being removed. Fig. 12 is a horizontal section of a roll, the shaft being integral therewith. Fig. 13 is a detail perspective view, enlarged, of a work-table. Fig. 14 is a transverse sectional view of the same on the line F F, Fig. 13.

In the said drawings like reference-numerals designate like parts.

The reference-numeral 1 designates the front of the machine, 2 the back, and 3 the housings.

4 and 5 represent the upper and lower front rolls, respectively, the roll 4 being situated directly above and contiguous to roll 5.

6 and 7 are the back rolls, which correspond with rolls 4 and 5, the roll 6 being situated directly above and contiguous to roll 7.

8 and 9 are small rolls situated near to the rolls 5 and 7, respectively, and slightly above the plane occupied by said rolls 5 and 7, the purpose of which arrangement will presently be shown.

Midway between rolls 4 and 6 and occupying the same plane is a small roll 10, and directly beneath said roll 10 is a roll 11.

In each of the rolls are a number of annular recesses or grooves 12 in the periphery thereof, and on the peripheries of these grooves are teeth or sprocket-cogs designed to engage corresponding openings in endless sprocket-chains 14, which pass around and connect said rolls carrying the laminated packs of metal. One set of said endless sprocket-chains, as shown in Fig. 5, passes from the top of roll 4 over the top of roll 10 to the top of roll 6 and around and under roll 6, thence downward under roll 9, thence upward over roll 11, thence downward under roll 8, and thence upward under and around roll 4 to the starting-point. The other set of said endless sprocket-chains passes from the bottom of roll 5 direct to the bottom of roll 7, rolls 8 and 9 being situated slightly above the plane of rolls 5 and 7, so as to not interfere with the sprocket-chains which pass from roll 5 to roll 7. Said chains pass thence upward around said roll 7 and down under roll 9, thence upward over roll 11, thence downward under roll 8, and thence upward over and around roll 5 to the starting-point.

The annular grooves 12 are made of such a depth that when the chains are placed therein the exposed surface of the chains will flush with the surface of the rolls in which they lie. By this construction it is apparent that the surface of the laminated pack will not be injured by the chains when said pack is passing between two oppositely-disposed rolls.

15 designates a shaft journaled in the housings 3, and on one end of said shaft 15 outside the housing is a belt-wheel 16, adapted to be connected by belt with the motive power which is to drive the machine. Also secured on said shaft 15 is a fly-wheel 17, and between said fly-wheel and the side of the housing on said shaft 15 is a spur-wheel 18, said wheel being geared with the spur-wheel 19, which is secured on the end of the shaft passing through roll 5. On the opposite end of the shaft passing through roll 5 is a spur-wheel 20, which is geared with the spur-wheel 21 on the shaft passing through roll 4, said gearing driving said roll 4. Said spur-wheel 20 is also geared with the idle spur-wheel 22, 22 with the idle spur-wheel 23, 23 with the idle spur-wheel 24, and 24 with spur-wheel 25, which is on the end of the shaft of roll 7, said intermediate gearing driving said roll 7. The idle wheel 23 is also geared with the spur-wheel 26. The idle wheel 24 is also geared with an idle wheel 27, which in turn is also geared with said spur-wheel 26. Said wheel 26 is secured on the end of a shaft 28, which passes through to the other side of the machine, and said wheel 26 is geared with the spur-wheel 29, which is on the end of the shaft of roll 11. The shaft 28 has on its other end a spur-wheel 30, which is geared with spur-wheel 31 on the end of the shaft of roll 11.

It is very apparent that the rolls may be geared and driven in various other ways than that herein shown, the foregoing simply illustrating one of various methods. Hence we do not desire to limit ourselves to the precise gearing shown and described.

The rolls are shown in Figs. 5 and 10 as on a keyed shaft with a key 32; but the rolls and shaft may be constructed in one piece, as shown in Fig. 12.

At each end of the machine is a work-table (clearly shown in Figs. 4, 13, and 14) of any desired construction, but preferably of two or more bars 33, with cross bars or slats 42 bolted at each end to said bars by bolts 43. Said work-tables are secured at each end to the sides of the housings 3. The front table is adapted to be used as a table upon which the laminated pack is placed in feeding the same to the machine and the table on the back is to receive the pack as it is discharged from the machine.

In each of the housings 3 are two openings 34 and 35. Adjustably mounted in said openings 34 are journal blocks or boxes 36, in which the ends of the shafts of roll 6 are journaled, as is clearly shown in Figs. 1, 3, 6, and 7, and adjustably mounted in said openings 35 in the housings are journal-boxes 37, as shown in Fig. 5, in which the ends of the shafts of rolls 10 and 11 are journaled. A vertical threaded bolt 38 passes from the top of each housing downward into and is pivotally secured in each of said journal-boxes, and, as is obvious, by tightening the nut 39, carried by the head of each bolt 38, the boxes in which said rolls are journaled will be raised, tightening the sprocket-chains 14, and by loosening the nuts 39 on said bolts 38 the opposite result will be attained. The housings 3 are firmly braced at the top by rods 40, which are firmly bolted thereon and pass from the top of one housing to the other.

The rolls 6 and 7 differ in construction from the other rolls of the machine, although the difference is so slight as not to be noticeable in the illustrations. The roll 7 is constructed with a slightly-concave surface which tapers almost imperceptibly from each end toward the middle thereof, while the roll 6 is constructed with a slightly-convex surface which tapers very gradually from the middle toward each end. The object of this construction is to prevent the metal from passing from the machine in a warped or turned shape, which is the case when rolls of the usual construction are used.

We have shown in the illustrations teeth or sprocket-cogs 13 in the annular recesses or grooves in the peripheries of the rolls, and while these cogs may be used, as shown and described, yet we find that in actual use they are not necessary, as the friction of the rolls will carry the chains without the assistance of such cogs, and, moreover, the friction of the chains will turn such rolls as are not provided with special gearing. When such sprocket-cogs are used, they are not made of such a length as to interfere with or to cut or scratch the metal in passing through.

In operating our machine it will be readily understood that when a laminated pack of metal, as hereinbefore described, is placed between the rolls 4 and 5 it will pass downward under roll 8, being carried between the two sets of chains, thence upward and between rolls 10 and 11, thence downward under roll 9, and thence upward and out between rolls 6 and 7, and in its passage said pack will have been bent back and forth, loosening the sheets thereof, so that they may be readily separated without muscular effort.

From the foregoing description it is apparent that by a judicious placing of a greater number of rolls in each series a greater number of bends will be made in the pack of metal in its passage through the machine and additional effectiveness will be secured.

We have hereinbefore shown our invention in what we consider to be its simplest form, and it is obvious that many mere mechanical changes may be made in its construction and in the arrangement of parts without departing from the spirit or scope thereof. Hence we do not wish to limit ourselves to the precise construction and arrangement of parts herein shown.

Having thus described our invention, what we claim as new, and desire to secure by Letters Patent, is—

1. In a machine for opening laminated packs, the combination of two sets of primary rolls, one set at each end of the machine, secondary rolls arranged parallel to and in a different plane from said first-mentioned rolls, all of said rolls arranged in two series, one series above the other, annular grooves in the peripheries of each of the rolls, endless chains lying in said grooves and passing around and connecting the rolls in each series, the endless chains on the under side of the upper series and those on the upper side of the lower series traversing substantially the same path, and forming a carrier between the two series adapted to guide and carry a laminated pack of metal through the machine, substantially as and for the purposes set forth and described.

2. In a machine for opening laminated packs, the combination of two series of rolls, one series above the other, each roll provided with annular grooves in the periphery thereof, endless traveling chains mounted in said annular grooves and connecting the rolls in each series, the endless chains forming a carrier between said two series of rolls, and gearing for rotating said rolls to carry the chains and a pack of metal forward, substantially as and for the purposes set forth and described.

3. In a machine for opening laminated packs, the combination with the housings and two sets of primary rolls, one set at each end of the machine, of secondary rolls arranged parallel to and on a different plane from said first-mentioned rolls, all of said rolls arranged in two series, one series above the other, each roll provided with a number of annular grooves in the periphery thereof, endless traveling chains mounted in said annular grooves and connecting the rolls in each series, said endless chains forming a carrier between the two series of rolls adapted to guide and carry a pack of metal forward, and gearing for rotating said rolls to carry the chains and pack of metal through the machine, substantially as and for the purposes set forth and described.

4. In a machine for opening laminated packs, the combination of the housings, two series of rolls having their bearings in said housings, the rolls in each series connected by endless chains, said two series of rolls being arranged so that the chains on the upper series will travel in substantially the same path on the under side of said upper series as that traversed by the chains on the upper side of the lower series, said chains and rolls being adapted to carry a pack of metal through the machine, substantially as and for the purposes set forth and described.

5. In a machine for opening laminated packs, the combination of the housings, two series of rolls, each roll having its bearings in said housings and provided with a number of annular grooves in its periphery; two sets of endless traveling chains, one set mounted in said annular grooves, connecting the rolls, in each series; said two sets of endless chains forming a carrier between the two series of rolls adapted to guide and carry a laminated pack of metal forward, means whereby some of said rolls may be raised or lowered to tighten or slacken the chains, and gearing for rotating said rolls to carry the chains and metal through the machine, substantially as and for the purposes set forth and described.

6. In a machine for opening laminated packs, the combination of two sets of oppositely-disposed rolls, one set at the front and the other at the rear end of the machine, the lower roll of the rear set having a concave surface and the upper a corresponding convex surface designed to prevent the metal from passing from the machine in a warped shape, secondary rolls arranged parallel to and in a different plane from said first-mentioned rolls, all of said rolls arranged in two series, endless traveling chains passing around and connecting the rolls in each series, the two sets of endless chains forming a carrier between the two series of rolls adapted to guide and carry a laminated pack of metal through the machine, and driving mechanism and gearing for rotating said rolls to carry the chains and pack of metal, substantially as described, and for the purposes set forth.

7. In a machine for separating the sheets of a laminated pack of metal, the combination with the housings and two sets of oppositely-disposed rolls, one set at each end of the machine, of secondary rolls arranged in a different plane from and parallel to the first-mentioned rolls; all of said rolls being arranged in two series, one series above the other; annular grooves in the peripheries of each of the rolls, sprocket cogs or teeth in said annular grooves, endless sprocket-chains lying in said annular grooves and engaging said sprocket cogs or teeth; said chains passing around and connecting all the rolls in each series, and adapted to guide and carry a laminated pack of metal through the machine; and driving mechanism and gearing for rotating said rolls to carry the chains and pack, substantially as and for the purposes set forth and described.

Signed by us at Wheeling, West Virginia, this 2d day of January, 1901.

GEORGE STEIN.
  GEORGE EDWARD STEIN.

Witnesses:
  W. B. KLEVIES,
  CHARLES SCHUL.